(12) United States Patent
Wilt et al.

(10) Patent No.: US 7,262,776 B1
(45) Date of Patent: Aug. 28, 2007

(54) INCREMENTAL UPDATING OF ANIMATED DISPLAYS USING COPY-ON-WRITE SEMANTICS

(75) Inventors: Nicholas P. Wilt, Rochester, NY (US); Paolo E. Sabella, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 286 days.

(21) Appl. No.: 10/836,364

(22) Filed: Apr. 29, 2004

Related U.S. Application Data

(63) Continuation-in-part of application No. 10/388,112, filed on Mar. 12, 2003, now Pat. No. 6,911,983.

(51) Int. Cl.
*G09G 5/399* (2006.01)
*G06F 13/00* (2006.01)
(52) U.S. Cl. ..................... 345/539; 345/537
(58) Field of Classification Search ........... 345/537, 345/539
See application file for complete search history.

(56) References Cited

U.S. PATENT DOCUMENTS 5,742,788 A   4/1998  Priem et al.
5,844,569 A * 12/1998  Eisler et al. .............. 345/619
2002/0085013 A1* 7/2002  Lippincott ................. 345/572

OTHER PUBLICATIONS

Tanenbaum, Andrew S., *Modem Operating Systems*, 2nd Ed., Prentice Hall, New Jersey, 2001, 5 pages.

* cited by examiner

*Primary Examiner*—Kee M. Tung
*Assistant Examiner*—Hau H Nguyen
(74) *Attorney, Agent, or Firm*—Townsend and Townsend and Crew LLP

(57) ABSTRACT

Tile buffers in a graphics processing system are managed using "copy-on-write" semantics, in which tile data stored in a memory location is not transferred to another location until the tile data for one of the buffers is modified, thereby providing copy on flip behavior to support incremental updating of the data. Tile data for a new frame is written to one of the two memory spaces by reference to a first logical buffer that associates each tile with one of the memory spaces. Concurrently, tile data for a current frame is read from the two memory spaces by reference to a second logical buffer that also associates each tile with one of the memory spaces. In response to a frame flip signal, the tile associations of the second logical buffer are modified to match those of the first logical buffer. Subsequent tile data updates are written to the memory spaces by reference to the second logical buffer after modifying one of the first and second tile associations such that they no longer match.

19 Claims, 6 Drawing Sheets

InCREMENTAL UPDATING OF ANIMATED DISPLAYS USING COPY-ON-WRITE SEMANTICS

CROSS-REFERENCES TO RELATED APPLICATIONS

This application is a continuation-in-part of U.S. patent application Ser. No. 10/388,112, filed Mar. 12, 2003 now U.S. Pat. No. 6,911,983, which disclosure is incorporated herein by reference for all purposes. The present disclosure is related to co-pending U.S. patent application Ser. No. 10/388,267, filed Mar. 12, 2003, entitled "Desktop Compositor Using Copy-on-Write Semantics," which disclosure is incorporated herein by reference for all purposes.

BACKGROUND OF THE INVENTION

The present invention relates in general to computer image processing and in particular to systems and methods for providing double-buffering for image data using copy-on-write semantics.

Computer display devices typically display images by coloring each of a number of independent pixels (picture elements) that cover the display area. The computer system determines a color value for each pixel using various well-known graphics processing techniques. Once color values are generated, pixel data representing the color values is written to a "frame buffer," an area of memory with sufficient capacity to store color data for each pixel of the display device. To display an image, scanout control logic reads the pixel values sequentially from the frame buffer and converts them to analog signals that produce the desired pixel colors on the display device. Scanout is generally performed at a constant frame rate, e.g., 80 Hz.

The demand for access to the frame buffer memory can be quite large. For instance, scanout at 80 Hz for a 1024×768 pixel display with 32-bit color requires the ability to read 2 Gbits per second. At the same time, data for the next frame is also being written to the frame buffer, often at high rates. Thus, memory bandwidth is generally a scarce resource in image processing systems.

To improve memory access times and to prevent undesirable visual artifacts that can result if pixel data in the frame buffer is updated during scanout of a frame, many graphics processing systems (or other image generation systems) provide a double-buffered frame buffer, as shown in FIG. 1. Frame buffer 100 includes two memory spaces 102, 104, each of which has sufficient capacity to store pixel data for a complete display frame. At a given time, one memory space (e.g., space 102) is designated as the "back" buffer while the other (e.g., space 104) is designated as the "front" buffer. Applications 106, 108 write pixel data to respective sections 110, 112 of the back buffer (memory space 102) while the front buffer (memory space 104) is read and displayed by scanout control logic 114. Memory spaces 102, 104 are generally designed to be accessed in parallel, to reduce conflicts between updating and scanout operations. At the end of each scanout frame, the buffers are swapped, i.e., the memory space 102 designated as the front buffer becomes the back buffer and vice versa. The next frame is written to the new back buffer (e.g., memory space 104) while the new front buffer (memory space 102) is scanned out.

To avoid redrawing the entire frame in the back buffer, some existing systems also copy the content of the back buffer to the front buffer at the time of swapping, so that the back buffer can be updated rather than being completely rewritten. That is, at the end of a scanout frame, data from the back buffer (memory space 102) is copied (e.g., by a block transfer) to the front buffer (memory space 104). Memory references (e.g., pointers or base addresses) used by applications 106, 108 and scanout control logic 114 are typically also swapped at this point so that during the next scanout pass, the memory space 102 that was used as the back buffer is scanned out while the other memory space 104 receives pixel data updates. This procedure, which is referred to as a "copy on flip," can reduce demand for write access during the frame interval, but the peak demand for memory bandwidth can be quite high due to the need to copy an entire frame of pixel data at each frame flip.

It is often the case that some or all of the pixel values do not change during a particular frame interval. Nevertheless, at the end of the frame, data for every pixel is copied, regardless of whether a particular pixel value was updated or not. The copying of unmodified pixel data results in a waste of memory bandwidth.

This problem can be compounded in proposed desktop compositor systems. In general, such systems differ from the system of FIG. 1 in that pixel data generated by applications or other data sources is not written directly to the frame buffer. Instead, for each application, a dedicated area of "drawing" memory is provided as a buffer for storing pixel data generated by that application. A desktop compositor combines data from the drawing memories of various applications to generate a desktop pixel value, which is stored in a desktop frame buffer. The desktop frame buffer is then scanned out to produce the display image. The drawing memories can be double-buffered, with applications writing to a "back" drawing buffer and the desktop compositor reading from a "front" drawing buffer. Likewise, the desktop frame buffer can also be double-buffered, with the desktop compositor writing to a "back" desktop buffer and the scanout control logic reading from a "front" desktop buffer. Such systems are desirable because visual effects such as transparent or translucent windows are more easily implemented. In addition, providing each application with a separate drawing memory reduces contention among applications for write access to the frame buffer.

Such systems, however, do not reduce the copying of unmodified pixel data between the various buffers. In implementations where application data is copied between two drawing buffers to support incremental updating of the application image, the amount of data that has to be moved can become prohibitive.

It would therefore be desirable to provide a double-buffering system that avoided copying of unmodified pixel data, thereby reducing the demand for memory bandwidth.

BRIEF SUMMARY OF THE INVENTION

Embodiments of the present invention provide memory management systems and methods for pixel data buffers in a graphics processing system using "copy-on-write" semantics. The display area is segmented into a number of tiles, where each tile includes one or more pixels, and pixel data for a particular tile is transferred from one location in memory to another only when the data is to be modified. To the extent that tiles are not modified during a frame interval, the need to transfer tile data between memory locations is reduced, thereby decreasing the demand for memory bandwidth.

According to one aspect of the present invention, a method for generating image data is provided. Tile data for a tile of a new frame is written to one of two memory spaces by reference to a first logical buffer, the first logical buffer providing a first association for each of a number of tiles to one of the two memory spaces. Concurrently with the act of writing, tile data for a current frame is scanned out from one of the two memory spaces by reference to a second logical buffer, the second logical buffer providing a second association for each of the tiles to one of the two memory spaces. A frame flip signal is received, and in response to the frame flip signal, the first logical buffer is copied to the second logical buffer by modifying the second tile associations to match the first tile associations. Thereafter, tile data for a selected tile of a subsequent frame may be written to one of the two memory spaces by reference to the second logical buffer (or, in an alternative embodiment, by reference to the first logical buffer) after modifying one of the first and second tile associations for the selected tile to no longer match the other of the first and second tile associations for the selected tile. Concurrently with writing tile data for the subsequent frame, tile data for the new frame may be scanned out from one of the two memory spaces by reference to the first logical buffer (or, in an alternative embodiment, by reference to the second logical buffer). In some embodiments, the tile data for the tile of the new frame may be provided by an application or by a desktop compositor that may be configured to provide incremental updates to the tile data relative to the current frame.

The following detailed description together with the accompanying drawings will provide a better understanding of the nature and advantages of the present invention.

DETAILED DESCRIPTION OF THE INVENTION

Embodiments of the present invention provide memory management systems and methods for pixel data buffers in a graphics processing system using "copy-on-write" semantics. The display area is segmented into a number of tiles, where each tile includes one or more pixels, and pixel data for a particular tile is transferred from one location in memory to another only when the data is to be modified. To the extent that tiles are not modified during a frame interval, the need to transfer tile data between memory locations is reduced, thereby decreasing the demand for memory bandwidth.

Figure 1:
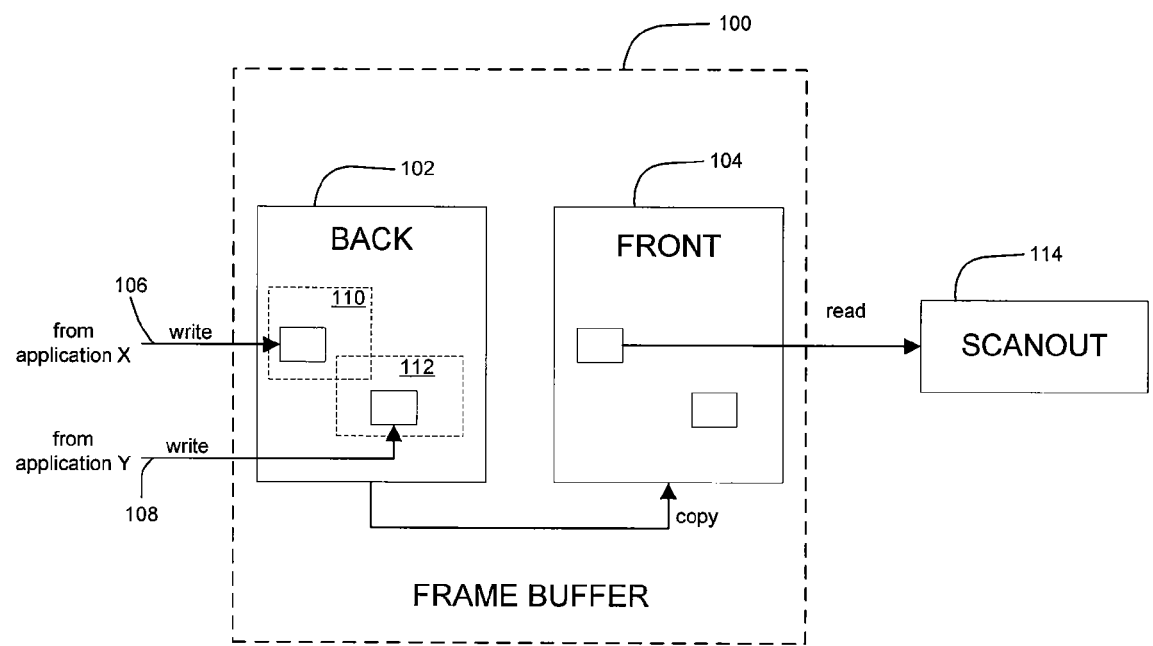
FIG. 1 is a block diagram of a conventional double-buffered frame buffer.
Figure 2:
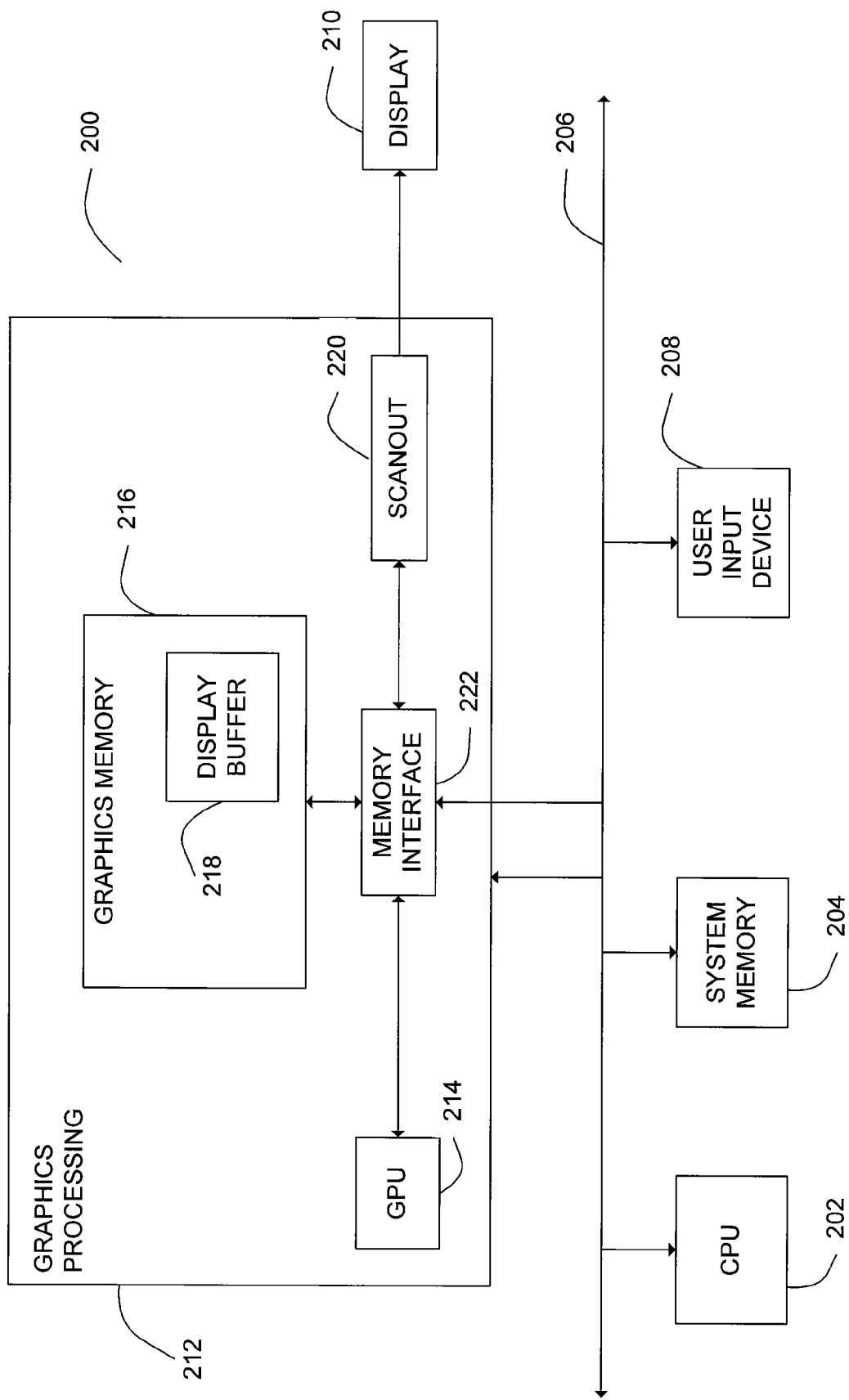
FIG. 2 is a block diagram of a computer system according to an embodiment of the present invention.

FIG. 2 is a block diagram of a computer system 200 suitable for implementing the present invention. Computer system 200 includes a central processing unit (CPU) 202 and a system memory 204 communicating via a system bus 206. User input is received from one or more user input devices 208 (e.g., keyboard, mouse) coupled to system bus 206. Visual output is provided on a display device 210 (e.g., a conventional CRT- or LCD-based monitor) operating under control of a graphics processing subsystem 212 coupled to system bus 206. Graphics processing subsystem 212 includes a graphics processing unit (GPU) 214, a graphics memory 216 including a double-buffered display buffer 218, and scanout control logic 220. GPU 214 and scanout control logic 220 access display buffer 218 through a display memory interface 222, which may also control access to other areas of graphics memory 216. Display memory interface 222 may be coupled to system bus 206 to allow communication between CPU 202 and display buffer 218; alternatively, CPU 202 may communicate with display memory interface 222 via GPU 214.

In operation, CPU 202 executes one or more application programs, which generate image data. This data is provided via the system bus to the graphics processing subsystem. Some applications may generate pixel data and provide it to display buffer 218. Other applications may generate image data in the form of geometric representations that GPU 214 converts to pixel data. Any technique for generating pixel data may be used; a number of such techniques are known in the art. Regardless of how it is generated, pixel data is stored in display buffer 218 via memory interface 222. In accordance with the present invention, memory interface 222 manages data storage in display buffer 218 using copy-on-write semantics, as will be described below. In some embodiments, memory interface 222 also performs additional tasks, such as optimizing use of available memory bandwidth (e.g., by prioritizing memory access requests).

Data in display buffer 218 is read out via memory interface 222 by scanout control logic 220, which generates control signals for the display device. In one embodiment, scanout control logic 220 reads the display buffer and refreshes the display at a constant frame rate (e.g., 80 Hz); the frame rate can be a user-selectable parameter. Scanout control logic 220 may include various operations such as digital-to-analog conversion, generating composite images using the pixel data from display buffer 218 and other pixel data sources (not shown) such as a video overlay image or a cursor overlay image, and the like. Such operations are known in the art.

It will be appreciated that FIG. 2 is illustrative and that modifications are possible. For instance, a separate GPU is not required; all pixel data can be supplied directly from the CPU or other system components. The memory interface and/or scanout control logic may be integrated with the GPU or provided as separate devices. A GPU, memory interface, and/or scanout control logic may be implemented using any suitable technologies, e.g., as one or more integrated circuit devices. Such devices may be mounted on an expansion card that may include one or more GPUs, mounted directly onto a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use graphics memory and system memory in any combination. In particular, the display buffer may be implemented in dedicated graphics memory or system memory as desired. The display device can be any pixel-based display device. In view of the present disclosure, one of ordinary skill in the art will recognize that a wide variety of system configurations can be used for practicing the present invention.

In accordance with an embodiment of the present invention, display buffer 218 provides double-buffering of pixel data and is managed by memory interface 222 using copy-on-write semantics. For memory management purposes, the display frame is segmented into a number (N) of non-overlapping tiles, where each tile includes one or more pixels. Data for a tile is copied from one buffer to the other when some or all of the pixels in the tile are to be updated. Tiles can be of any size, and tile size can advantageously be selected based on properties of graphics memory 216, such as memory transaction size; for instance, if graphics memory 216 can transfer data for 32 pixels in one transaction, a tile size of 4×8 pixels can be selected.

Figure 3:
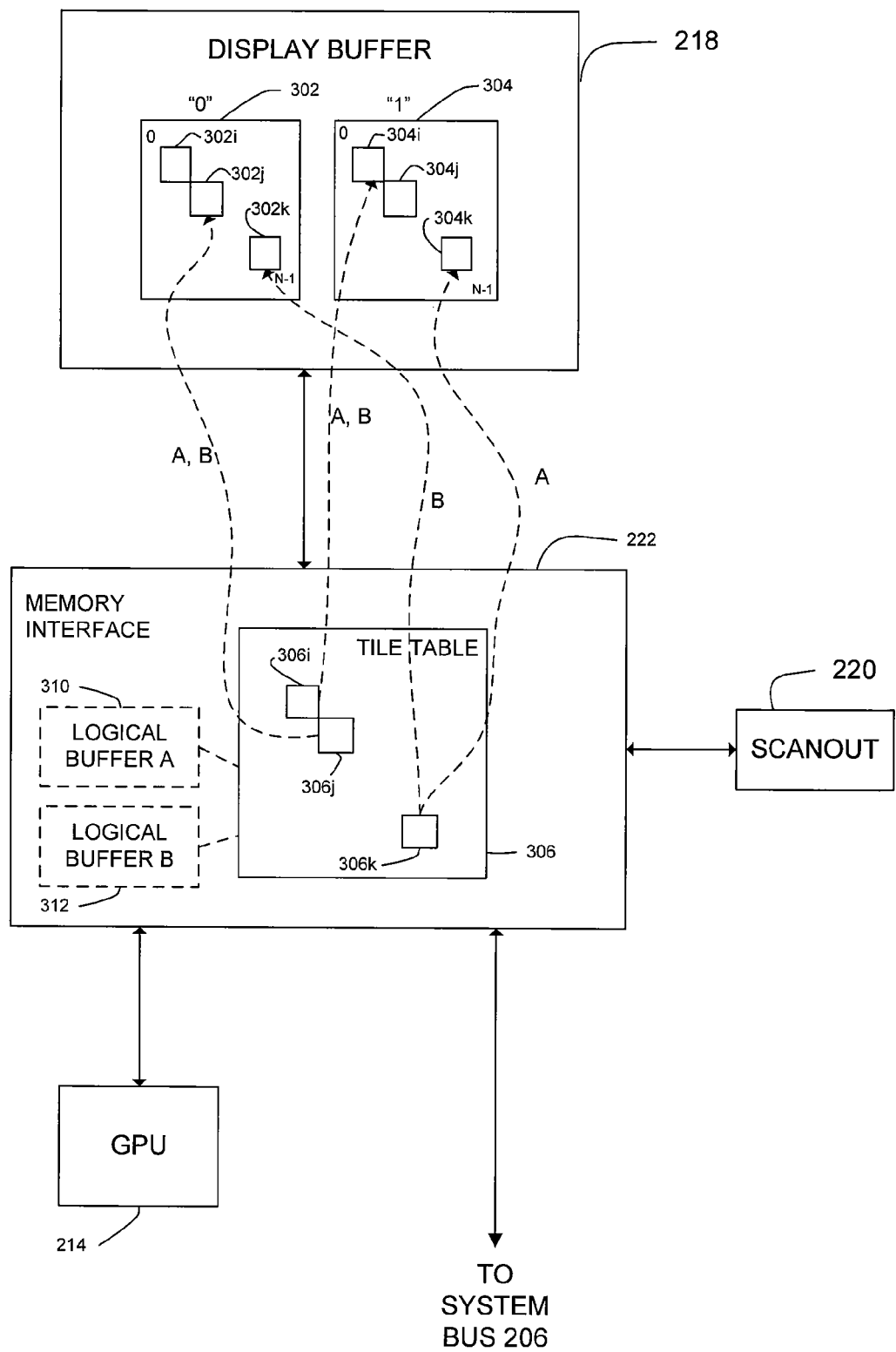
FIG. 3 is a block diagram of a double-buffered frame buffer according to an embodiment of the present invention.

FIG. 3 is a block diagram of memory interface 222 and display buffer 218 in accordance with an embodiment of the present invention. In this embodiment, display buffer 218 includes two physical memory spaces 302, 304, each of which can store tile data for all N tiles (numbered 0, 1, ..., N-1) of the display. Data for tile i can be stored in either of two locations: location 302i or location 304i.

Rather than directly referencing one of memory spaces 302, 304, the data-writing and scanout processes access display buffer 218 by reference to two logical buffers, denoted herein as "A" and "B" and represented by dotted boxes 310, 312 in FIG. 3. As will be apparent in view of the present disclosure, logical buffers A and B do not store tile data and need not be implemented as memory structures. At any given time, one of the two logical buffers (e.g., buffer A) is used for writing pixel data while the other (e.g., buffer B) is used for reading pixel data. Memory interface 222 associates each of the two logical buffers with one of the memory spaces 302, 304, and the associations are made and updated on a tile-by-tile basis. Upon receiving a memory access command referencing a tile of one of the logical buffers, memory interface 222 determines which of the two memory spaces 302, 304 is associated with that tile of the referenced logical buffer and accesses the appropriate memory space to execute the command. For instance, logical buffers A and B can be implemented using address generating circuitry that receives a reference to a tile of one of the two logical buffers (e.g., to tile i of logical buffer A) and generates the address of the memory location in display buffer 218 that is associated with the tile (e.g., location 304i).

To maintain the associations of the logical buffers A and B with the memory spaces 302, 304 on a tile-by-tile basis, memory interface 222 advantageously uses a tile table 306. Tile table 306 includes an entry (e.g., entries 306i, 306j, 306k) for each of the N tiles; the entry provides enough information to determine which of the two memory spaces 302, 304 each logical buffer is associated with. It should be noted that the association (or mapping) is defined independently for each tile and that for any given tile the two logical buffers can be associated with the same memory location or with different memory locations. For instance, the dashed arrows in FIG. 3 illustrate some possible associations: tile table entry 306i indicates that, for tile i, buffers A and B are both associated with location 304i; tile table entry 306j indicates that, for tile j, buffers A and B are both associated with location 302j; and tile table entry 306k indicates that, for tile k, buffer A is associated with location 304k while buffer B is associated with location 302k. Tile table 306 can be implemented in any manner that unambiguously associates each of logical buffers A and B with a location in one of the two tile memories on a tile-by-tile basis. Some specific embodiments of tile table 306 are described below.

It will be appreciated that the memory configuration described herein is illustrative and that modifications are possible. Memory spaces 302, 304 can be implemented using one or more video memory (VMEM) devices or other suitable memory technologies. Memory spaces 302, 304 are not required to be physically adjacent to each other or even on the same chip, nor is either of memory spaces 302 or 304 required to be implemented as a single contiguous area of memory. The location and configuration of memory spaces 302, 304 can be selected based on efficiency, space requirements, or other design considerations. The number of tiles N can be varied as desired; the size of a tile can be as small as one pixel or as large as desired.

Tile table 306 can be implemented outside graphics memory 216, e.g., using a register array located on the same chip as a circuit implementing memory interface 222, or within graphics memory 216. The former option avoids introducing additional demands for memory bandwidth and can further improve memory access times. In addition, tile table 306 can also be implemented using a separate table or array for each logical buffer. It will also be appreciated that use of a tile table is not required: tile associations can be provided by any technique that unambiguously associates each logical buffer with a memory location on a tile-by-tile basis and allows for modification of the associations for individual tiles.

Memory interface 222 uses logical buffers A and B and tile table 306 to manage memory spaces 302, 304 using "copy-on-write" semantics. The term "copy-on-write" denotes that copying of tile data occurs only when the tile data is actually modified. A command to copy tile data for a tile of a source buffer (e.g., buffer B) to a target buffer (e.g., buffer A) is executed by modifying the associations of the buffers (e.g., a tile table entry) without transferring any tile data from one memory location to another. A command to write data for a tile to a target buffer (e.g., buffer A) is executed by first ensuring that the target buffer and the other buffer (e.g., buffer B) are associated with different memory locations—which may require modifying the associations of the buffers (e.g., a tile table entry) and transferring tile data from one memory location to another—and then writing the new tile data. A command to read data for a tile from a source buffer (e.g., buffer B) is executed by identifying the memory location associated with the source buffer and reading data from that location.

Figure 4:
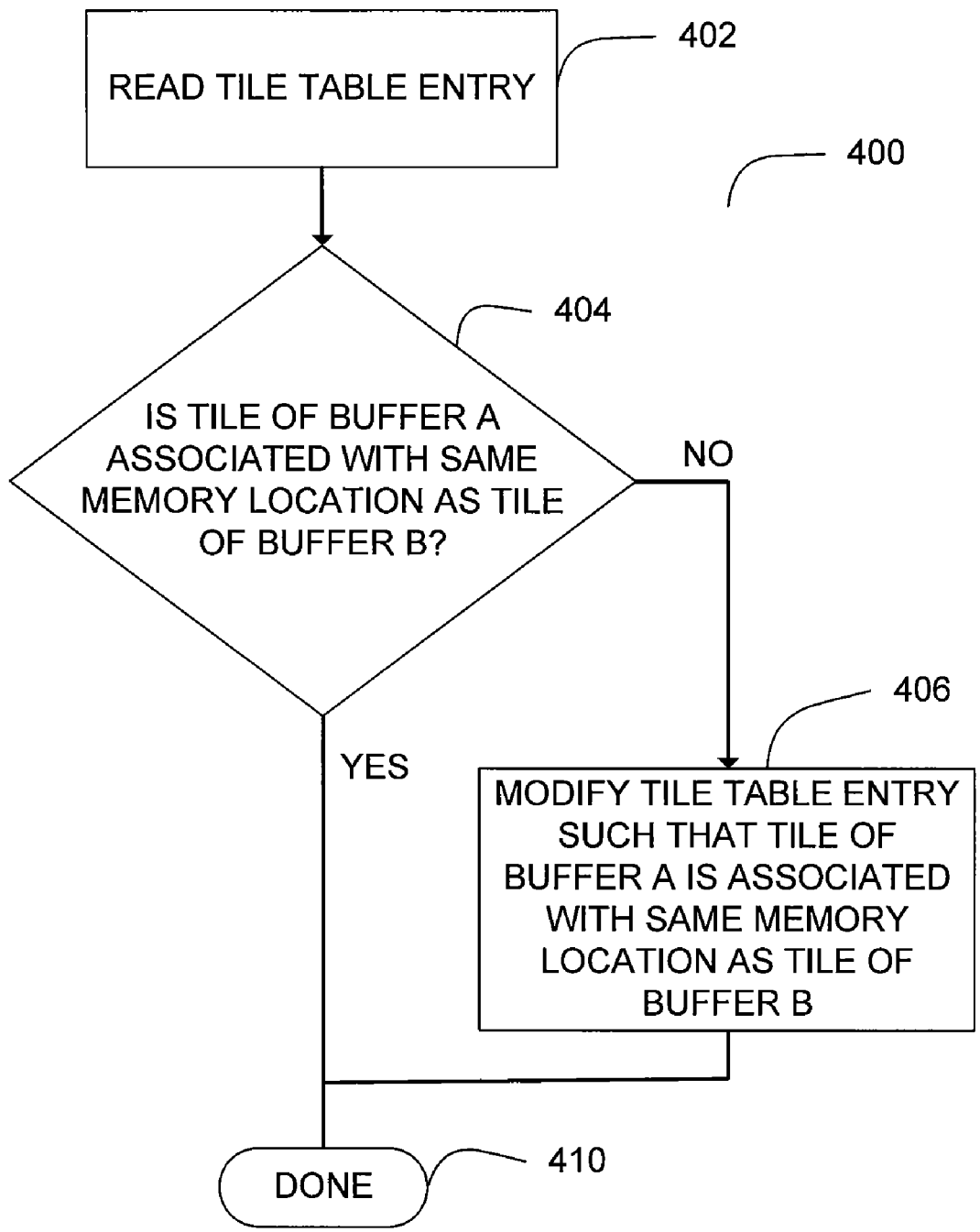
FIG. 4 is a flow chart of a process for copying tile data according to an embodiment of the present invention.

Examples of specific processes used by memory interface 222 to execute copy and write commands in accordance with an embodiment of the present invention will now be described with reference to FIGS. 4 and 5. FIG. 4 illustrates a process 400 for executing a command to copy a tile of buffer B to buffer A. At step 402, the tile table entry corresponding to the tile is read to determine which tile memory location is associated with the tile in each logical buffer. At step 404, it is determined whether the tile is associated with the same memory location for buffer A as it is for buffer B. If not, then at step 406, the tile table entry is modified so that the tile is associated with the same memory location for buffer A as it is for buffer B. For instance, in FIG. 3, tile k of logical buffer A is associated with memory location 304k while tile k of logical buffer B is associated with memory location 302k. At step 406, tile table entry 306k would be modified so that the tile is associated with memory location 302k for both buffers A and B. At step 410, the copy process is done; in some implementations, a "done" message may be sent to the source of the copy command.

It should be noted that process 400 modifies, at most, only a tile table entry, which generally includes a smaller number of bits than the tile data. In addition, if the tile table is implemented using on-chip registers, no memory access is required. In some embodiments, where the overhead associated with modifying a tile table entry is small, the comparison step (step 404) can be omitted; in that case, the tile table entry is always rewritten. It will be appreciated that a similar process can be provided for copying a tile of buffer A to buffer B.

Copying an entire buffer (e.g., copying buffer B to buffer A) can be implemented by applying process 400 to each tile of the buffers. In this case, the copying operation can be performed for any or all of the tiles sequentially, in parallel, or by a block copying operation, depending on the implementation of the tile table or other tile association technique.

Figure 5:
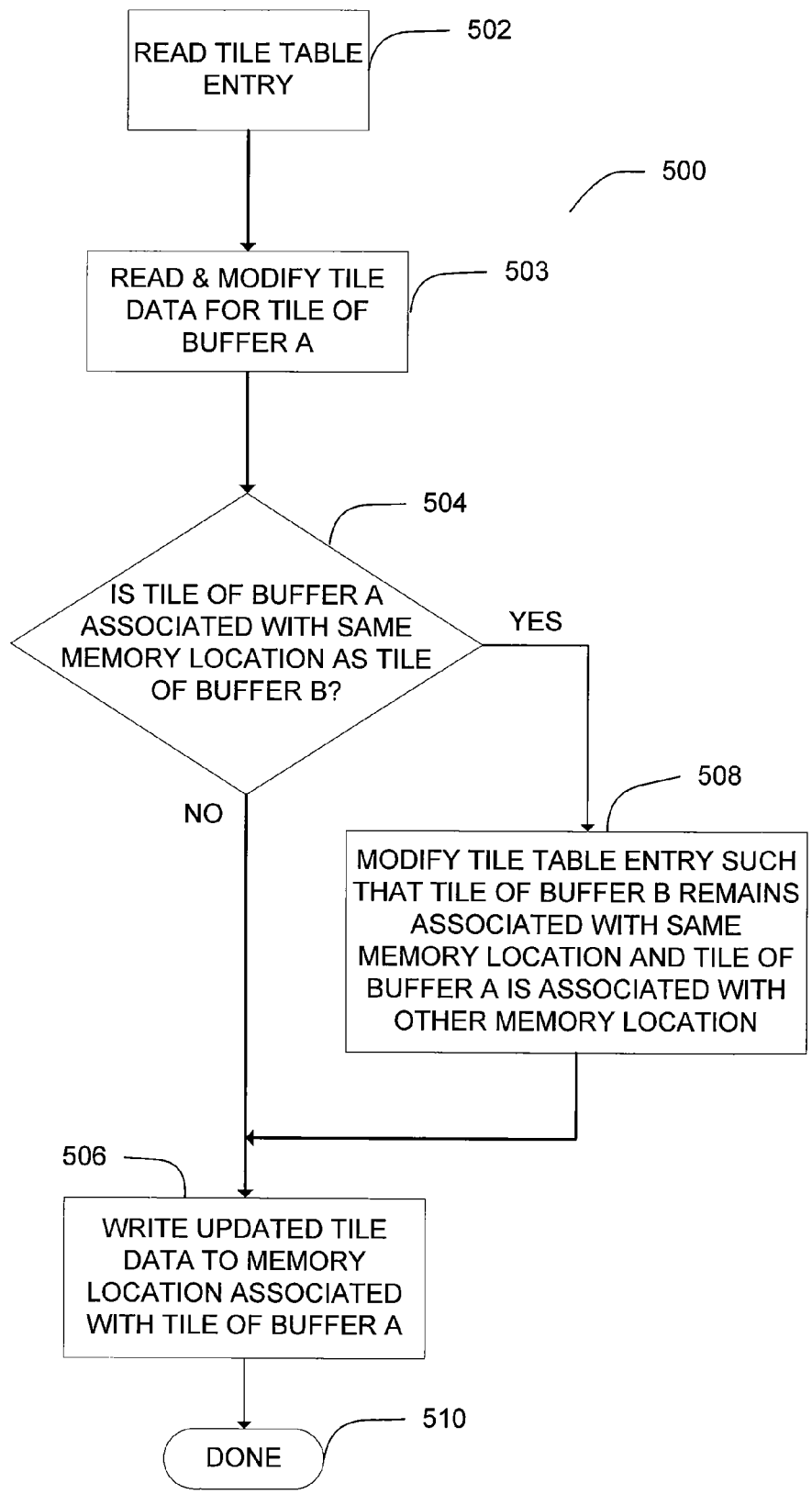
FIG. 5 is a flow chart of a process for writing tile data to a buffer according to an embodiment of the present invention.

FIG. 5 illustrates a process 500 for executing a command to write new tile data to a tile of buffer A in accordance with the present invention. The process involves ensuring that the tile is associated with different memory locations for buffers A and B prior to writing the updated tile data. More specifically, at step 502, the tile table entry corresponding to the tile is read to determine which tile memory location each buffer is associated with. At step 503, the current tile data is read from the tile memory location associated with the tile of buffer A (e.g., into an on-chip register) and updated. Prior to writing the updated tile data back to the memory, it is determined at step 504 whether buffers A and B are associated with the same tile memory location. If not, then writing to the location associated with buffer A will not affect buffer B and data is written to the location associated with buffer A at step 506. At step 510, the write process is done; in some implementations a "done" message may be sent to the source of the write command.

If, however, buffers A and B are associated with the same location, then writing to the location associated with buffer A will also affect buffer B, which is generally not a desired result. To prevent this, at step 508, the tile table entry is modified to associate buffer A with the other available memory location for the tile, while buffer B continues to be associated with the original location. For example, in FIG. 3, for tile i, buffers A and B are both associated with memory location 304i. At step 508, tile table entry 306i would be modified so that buffer B remains associated with location 304i while buffer A is associated with location 302i. At this point, buffers A and B are associated with different memory locations, so that writing to the location associated with buffer A does not affect buffer B. At step 506, the updated tile data is written to the memory location associated with buffer A. It will be appreciated that a similar process can be provided for writing data for a tile to buffer B.

In another embodiment, rather than reading and updating tile data, new tile data for some or all of the pixels in the tile is stored directly to memory. In this embodiment, step 503 is omitted, and step 508 includes copying all pixel data for the tile (e.g., by block transfer) from the memory location associated with buffer B to the memory location associated with buffer A. Copying all of the pixel data for the tile prior to writing the new data at step 506 preserves the original content of the tile so that the new data to be written can include data for fewer than all of the pixels in the tile.

It should be noted that processes 400 and 500 can be implemented within the graphics memory interface, transparent to applications, scanout processes, or any other source of memory access commands. For instance, the graphics memory interface can provide an application with a reference to one of the logical buffers to be used as a "back" display buffer for writing data. The application can issue a conventional write command targeting the buffer; the graphics memory interface executes the write command according to process 500 and returns any appropriate signals to the application. Thus, conventional applications and techniques for generating pixel data can be used with the present invention, as can conventional scanout control logic.

Examples of embodiments of tile table 306 and corresponding implementations of processes 400 and 500 will now be described. In a first embodiment, a tile table entry TT[t] for each tile t includes a first bit P[t] indicating which of the two memory spaces is associated with the tile in logical buffer A, and a second bit Q[t] indicating which of the two memory spaces is associated with the tile in logical buffer B. In other words, if a tile memory location is denoted by Tiles[m][t], where m=0 (m=1) denotes the first (second) memory space 302 (304), then tile t of buffer A (denoted by A[t]) is associated with Tiles[P[t]][t] and tile t of buffer B (denoted by B[t]) is associated with Tiles[Q[t]][t]. In this embodiment, for tile i in FIG. 3, P[i]=Q[i]=1; for tile j, P[j]=Q[j]=0; and for tile k, P[k]=1, Q[k]=0.

In accordance with process 400, copying a tile t of buffer B to buffer A can be implemented according to the following pseudocode fragment:

P[t]=Q[t], where the conditional step 404 of process 400 has been omitted since copying a single bit has low overhead. In accordance with process 500, a command to write tile data for tile t to buffer A can be implemented according to the following pseudocode fragment.

read(tile data, Tiles[P[t]][t]);
update tile data;
if (P[t]==Q[t]) {
P[t]=~P[t]; /* ~is logical NOT */
}
write(tile data, Tiles[P[t]][t]).

Pseudocode implementations of corresponding processes for copying a tile from buffer A to buffer B and for writing tile data to buffer B can be obtained by replacing "A" with "B" and "P" with "Q" in the above pseudocode fragments. It is to be understood that the use of pseudocode is for illustrative purposes and that processes 400 and 500 can be implemented in hardware, software, or any combination of the two.

In another embodiment, a tile table entry TT[t] for tile t includes a first bit P[t] indicating which of the two tile memories is associated with the tile in buffer A and a second bit D[t] indicating whether the tile in buffer B[t] is associated with the same tile memory (D[t]=0) or the other tile memory (D[t]=1). In the notation above, buffer location A[t] is associated with Tiles[P[t]][t] and buffer location B[t] is associated with Tiles[P[t]^D[t]][t], where ^ is the logical XOR operator. In this embodiment, for tile i in FIG. 3, P[i]=1, D[i]=0; for tile j, P[j]=0, D[j]=0, and for tile k, P[k]=0, D[k]=1.

In accordance with process 400, copying tile data for tile t from buffer B to buffer A can be implemented according to the following pseudocode fragment:

P[t]=P[t]^D[t];
D[t]=0;

where the conditional step 404 has again been omitted due to the low overhead of these operations. This changes the value of P[t] for a tile t if D[t]=1. Copying tile data for tile t from buffer A to buffer B can be implemented according to the following pseudocode fragment:

D[t]=0, where the conditional step 404 has again been omitted.

In accordance with process 500, writing updated tile data for tile t to buffer A can be implemented according to the following pseudocode fragment:

read(tile data, Tiles[P[t]][t]);
    update tile data;
    if (D[t]==0) {
    P[t]=~P[t];
    D[t]=1;
    }
    write(tile data, Tiles[P[t]][t]), Writing updated tile data for tile t to buffer B can be implemented according to the following pseudocode fragment:

read(tile data, Tiles[P[t]^D[t]][t]);
    update tile data;
    if (D[t]==0) {
    D[t]=1;
    }
    write(tile data, Tiles[P[t]^D[t]][t]).

It will be appreciated that these embodiments are illustrative and that other embodiments are possible. For instance, any four-state encoding scheme can be used to associate tiles of buffers A and B with locations in the memory spaces. Four states (S0, S1, S2, S3) can be defined, where S0 denotes that buffers A and B are both associated with memory space 0; S1 denotes that buffer A is associated with memory space 0 and buffer B with memory space 1; S2 denotes that buffer A is associated with memory space 1 and buffer B with memory space 0; and S3 denotes that buffers A and B are both associated with memory space 1. Accordingly, process 400 for copying a tile from buffer B to buffer A can be implemented as:

if (state==S1) {state=S3}
    else if (state==S2) {state=S0}.

Copying a tile from buffer B to buffer A can be implemented as:

if (state==S1) {state=S0}
    else if (state==S2) {state=S3}.

Writing tile data for a tile of buffer A can be implemented as:

if (state==S0) {state=S2}
    else if (state==S3) {state=S1};
    write updated tile data to tile of buffer A.

Writing tile data for a tile of buffer B can be implemented as:

if (state==S0) {state=S1}
    else if (state==S3) {state=S2};
    write updated tile data to tile of buffer B.

In other embodiments, the tile table entry may be a pointer (or other reference) to a memory location for the tile or to a base memory location for a tile memory array, with the tile number used to determine a tile-specific offset.

Figure 6:
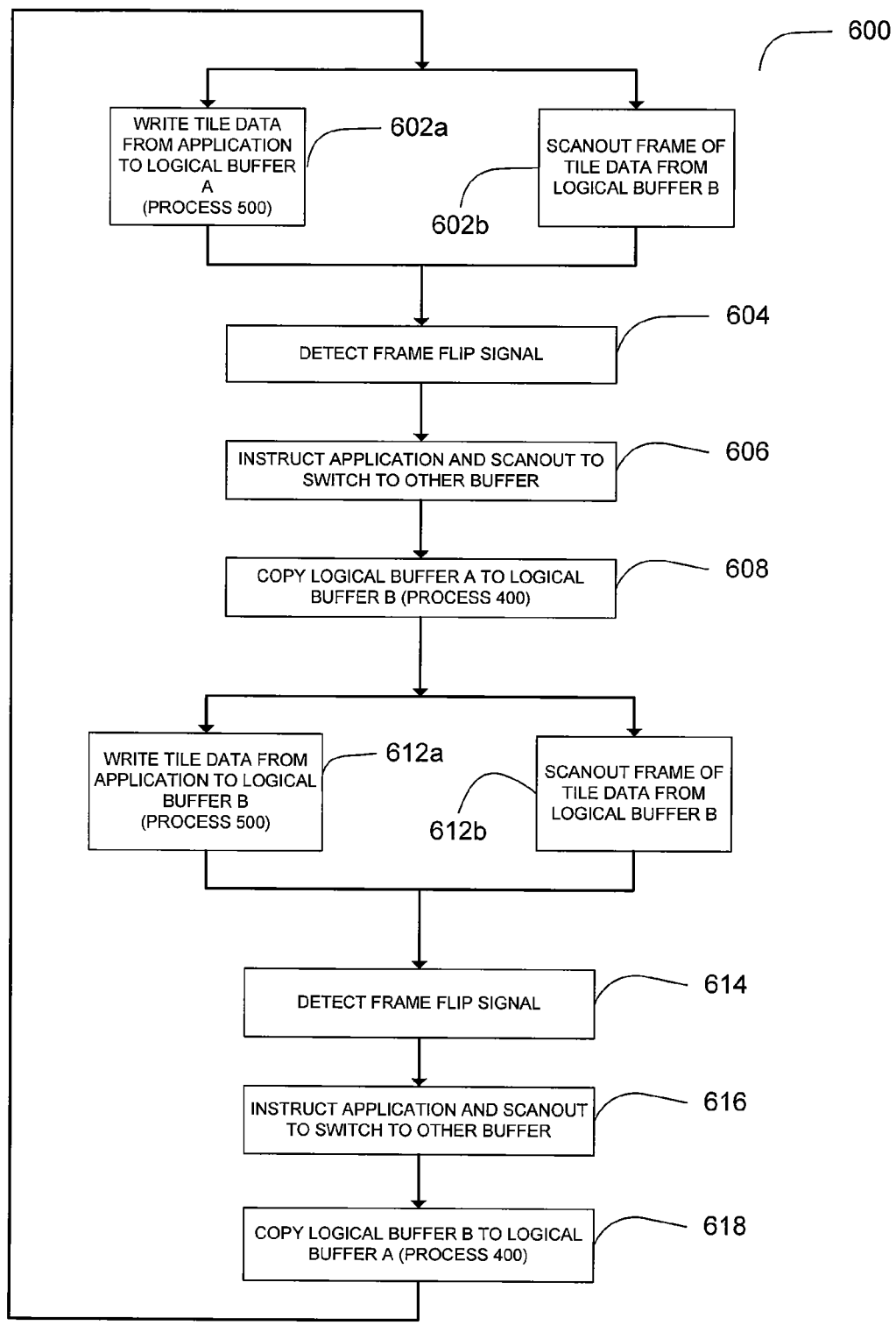
FIG. 6 is a flow chart of a memory management process for a frame buffer according to an embodiment of the present invention.

Processes 400 and 500 can be used to manage a double-buffered display buffer, as illustrated in FIG. 6. In process 600, applications write tile data to one of two logical buffers while the other logical buffer is scanned out; at the end of a scanout frame, the buffer that was updated is copied to the buffer that was scanned out. Copying and writing are performed using copy-on-write semantics as described above.

More specifically, at step 602*a*, one or more applications write tile data to logical buffer A (a "back" buffer) using process 500. In parallel, at step 602*b*, the scanout control logic reads and displays a frame of tile data from logical buffer B (a "front" buffer). In accordance with process 500, logical buffer A is updated without affecting logical buffer B; thus, the frame currently being displayed is not affected by any changes being made to tile data by applications.

At step 604, a frame flip signal is detected. In one embodiment, this signal is generated when the scanout control logic has finished reading the frame of tile data from logical buffer B (e.g., at a vertical retrace of a CRT display device). In another embodiment, in order to prevent visible "tearing" in displayed images, the frame flip signal is generated when scanout of the current frame is complete and a complete set of updates has been delivered to logical buffer A for the next frame. Generation of such signals can be done using techniques similar to those in conventional double-buffered systems.

At step 606, in response to the frame flip signal, the application and the scanout control logic are each instructed to switch to the other buffer. At step 608, logical buffer A is copied to logical buffer B, in accordance with process 400. Thereafter, at step 612*a*, the application writes tile data to logical buffer B (which is now the back buffer) in accordance with process 500. In parallel, at step 612*b*, the scanout control logic reads a frame of tile data from logical buffer A (which is now the front buffer). At step 614, the next frame flip signal is detected, indicating that the front and back buffer should be switched again. This step can be implemented similarly to step 604. In response, at step 616, the application and the scanout control logic are each instructed to switch to the other buffer. At step 618, logical buffer B is copied to logical buffer A using process 400. Thereafter, the process returns to step 602*a, b*, and process 600 continues as long as tile data is being displayed.

It should be noted that in process 600, tile data for a given tile is copied from one memory location to the other only when that tile is updated. In some embodiments, only a few tiles change during a typical frame interval; thus, the number of tiles for which data is copied can be small, and memory bandwidth can be substantially reduced as compared to conventional double-buffered frame buffers.

The copy-on-write semantics used in process 600 can be transparent to the applications and the scanout control logic. For instance, as described above with regard to processes 400 and 500, an application can issue write commands using a logical buffer reference provided by the graphics memory interface; the graphics memory interface executes the write command according to process 500 and returns any appropriate signals to the application. Similarly, the scanout control logic can issue read commands using a logical buffer reference provided by the graphics memory interface; the graphics memory interface returns the correct pixel data.

It will be appreciated that process 600 is illustrative and that variations and modifications are possible. For instance, at the end of step 608 (and step 618), logical buffers A and B are identical—i.e., for each tile, both buffers are associated with the same memory location. Thus, it is also possible to implement process 600 such that applications always write to logical buffer A and the scanout control logic always reads from logical buffer B (or vice versa).

As FIG. 6 illustrates, copy on write semantics implemented in accordance with the present invention can be used to provide "copy on flip" behavior, thereby allowing applications (or a desktop compositor) to incrementally update an image rather than redrawing the entire frame. For example, a user may be watching a video in a window on the desktop. The video image generally changes from frame to frame while other elements of the desktop (e.g., other windows, application icons, desktop background) may remain static. Computing power needed to generate the next frame can be reduced in a double-buffered system by copying pixels from the new front buffer to the new back buffer at each "flip" between the front and back buffers. The application(s) or desktop compositor can then update the back buffer incrementally, i.e., overwriting only tiles that have changed since the previous frame.

In accordance with process 600 of FIG. 6, copy on flip behavior can be implemented without copying all of the tile data by setting corresponding tiles of both logical buffers A and B to be associated with the same tile memory locations (steps 608, 618) when a frame flip (steps 604, 614) occurs. An application can then incrementally update the new back buffer (steps 602a, 612a); tiles for which new data is written can be copied in accordance with process 500 of FIG. 5 as the updates are performed. As previously noted, the fact that tile data was not actually copied at flip time can be transparent to the applications and the scanout control logic, both of which can issue conventional write and/or read commands.

This implementation of copy on flip behavior can considerably reduce the bandwidth requirements for the tile memory. For example, in one embodiment, 8K bits of data are stored per tile while the tile table entry for each tile includes 2 bits. In this embodiment, copying tiles by modifying tile table entries (e.g., according to process 400 of FIG. 4) requires only 1/2048 of the bandwidth required to actually copy the 8K bits of tile data between the tile memory locations. During generation of the next frame, some fraction of the tiles in the back buffer may be updated, and each tile update (e.g., process 500 of FIG. 5) requires moving 8K bits of data from one tile memory to the other as well as modifying the 2 bits of tile table information. The added overhead per modified tile is about 1/1024, or less than 1%, of the primary refresh bandwidth. The overall bandwidth savings will generally depend on the fraction of tiles that are modified and can be considerable. It is to be understood that these numbers are illustrative and not restrictive. In addition, various optimizations such as implementing the tile table in on-chip memory, while not required, may reduce the overhead in some embodiments.

In addition to reducing the total bandwidth, use of copy on write can also reduce the peak bandwidth demand and/or the dead time between frames. For instance, at each frame flip, there is a finite time interval during which data is being copied from the new front buffer to the new back buffer. This can lead to dead time if execution of buffer updating commands (e.g., drawing commands) is paused in order to avoid race conditions between the update and the copy. To the extent that modifying the tile table (e.g., 2 bits per tile) to effect a copy operation in accordance with an embodiment of the present invention requires less time than moving all of the tile data (e.g., 8K bits per tile), dead time can be reduced, allowing more efficient processor operation. Actual copying occurs as needed on a per-tile basis, which can help to keep the peak demand for bandwidth low.

The use of copy-on-write semantics to implement double buffering is not limited to frame buffers; the same semantics can be implemented to provide more efficient double buffering of pixel data in other contexts as well. For example, copy-on-write semantics can be applied to implement copy on flip behavior for any double-buffered tile memory in a desktop compositor system, including drawing memories managed by application programs and the desktop frame buffer managed by a desktop compositor module. Examples of such systems are described in above-referenced applications Ser. No. 10/388,112 and Ser. No. 10/388,267.

As described above, embodiments of the present invention provide systems and methods for managing double-buffered tile data buffers using copy-on-write semantics. Transferring of tile data between memory locations is reduced to the extent that there are tiles that are not modified during a frame interval, resulting in a substantial reduction in memory bandwidth. For example, if each tile includes 16 pixels, with 32 bits of data per pixel, then implementing a two-bit tile table according to the present invention can reduce the memory bandwidth required to perform the copy operation at the end of each frame by a factor of 256 (16*32/2). Each time a tile is written, an additional one or two bits in the tile table are updated, adding a small amount of overhead that, in a wide variety of circumstances, does not outweigh the reduction in memory bandwidth obtained by not moving tile data at the end of each frame. The copy-on-write logic described herein can be implemented using hardware, software, or any combination thereof.

While the invention has been described with respect to specific embodiments, one skilled in the art will recognize that numerous modifications are possible. As described above, the tile table can be implemented in a number of ways, so long as an unambiguous association of logical buffers with memory locations on a tile-by-tile basis is provided. The invention is also not limited to the context of a frame buffer; the systems and methods described herein can be adapted to buffering tile data in drawing memories as well.

The number of tiles and/or the number of pixels per tile can be selected as desired, e.g., based on a page size of the graphics memory device(s). In an implementation with fewer pixels per tile, tile updates for a particular tile may be less frequent, but the size of the tile table is increased. In addition, small tile sizes could lead to inefficient use of memory bandwidth, e.g., if the tile size is smaller than the amount of pixel data that can be transferred in a single read or write transaction. Assigning the same number and arrangement of pixels to each tile can simplify the implementation but is not required. Where the graphics processing system implements tile-based rendering, a tile size corresponding to the size of a rendering tile may be advantageously chosen, but other tile sizes could also be used, and the present invention does not require the use of tile-based rendering.

Thus, although the invention has been described with respect to specific embodiments, it will be appreciated that the invention is intended to cover all modifications and equivalents within the scope of the following claims.

What is claimed is:

1. A method for generating image data, the method comprising the acts of:
   (a) writing tile data for a tile of a new frame to one of two memory spaces by reference to a first logical buffer, the first logical buffer providing a first association for each of a plurality of tiles to one of the two memory spaces;
   (b) concurrently with the act of writing, scanning out tile data for a current frame from one of the two memory spaces by reference to a second logical buffer, the second logical buffer providing a second association for each of the plurality of tiles to one of the two memory spaces;
   (c) receiving a frame flip signal; and
   (d) in response to the frame flip signal, copying the first logical buffer to the second logical buffer by modifying the second tile associations to match the first tile associations so that the first and second tile associations each concurrently reference a same one of the two memory spaces.

2. The method of claim 1, further comprising the act of:
   (e) writing tile data for a selected tile of a subsequent frame to one of the two memory spaces by reference to the second logical buffer after modifying one of the first and second tile associations for the selected tile to no longer match the other of the first and second tile associations for the selected tile, wherein act (e) is performed subsequently to act (d).

3. The method of claim 2, wherein the second tile association for the selected tile is modified during act (e).

4. The method of claim 2, further comprising the act of:
(f) scanning out tile data for the new frame from one of the two memory spaces by reference to the first logical buffer, wherein act (f) is performed concurrently with act (e).

5. The method of claim 1, wherein the tile data for the tile of the new frame is provided by an application.

6. The method of claim 5, wherein the application is configured to provide incremental updates to the tile data relative to the current frame.

7. The method of claim 1, wherein the tile data for the tile of the new frame is provided by a desktop compositor.

8. The method of claim 7, wherein the desktop compositor is configured to provide incremental updates to the tile data relative to the current frame.

9. The method of claim 1, wherein the first tile associations and second tile associations are stored in a tile table having an entry for each of the plurality of tiles.

10. The method of claim 9, wherein each tile table entry includes a four-valued state indicator.

11. The method of claim 10, wherein each state indicator includes:
a first bit indicating which of the two memory spaces is associated with the first logical buffer, thereby providing the first tile association; and
a second bit indicating which of the two memory spaces is associated with the second logical buffer, thereby providing the second tile association.

12. The method of claim 10, wherein each state indicator includes:
a first bit indicating which of the two memory spaces is associated with the first logical buffer, thereby providing the first tile association; and
a second bit indicating whether the second logical buffer is associated with the same one of the two memory spaces as the first logical buffer, thereby providing the second tile association.

13. The method of claim 1, wherein the frame flip signal indicates that the current frame of data has been completely scanned out.

14. The method of claim 1, wherein the frame flip signal indicates that the current frame of data has been completely scanned out and that writing of tiles for the new frame of data is complete.

15. The method of claim 1, further comprising the act of:
(e) writing tile data for a selected tile of a subsequent of a subsequent frame to one of the two memory spaces by reference to the first logical buffer after modifying one of the first and second tile associations for the selected tile to no longer match the other of the first and second tile associations for the selected tile, wherein act (e) is performed subsequently to act (d).

16. A method for generating image data, the method comprising the acts of:
(a) receiving a command to write new tile data for a tile of a new frame to be associated with a first logical buffer;
(b) determining whether the first logical buffer and a second logical buffer are associated with a same memory space;
(c) receiving a frame flip signal;
(d) writing, in response to the frame flip signal, the new tile data for a tile of a new frame to a first memory space by reference to the first logical buffer, the first logical buffer providing a first association to the first memory space; and
(e) concurrently with the act of writing, scanning out tile data for a current frame from a second memory space by reference to the second logical buffer, the second logical buffer providing a second association to the second memory space.

17. The method of claim 16, further comprising the act of:
(f) identifying the first memory space as an available memory space, wherein the current memory space and the first memory space are different memory spaces,
wherein act (b) comprises the act of determining that the current memory space for the first logical buffer and the second memory space for the second logical buffer are a same memory space, and wherein act (f) occurs subsequently to act (b) and before act (c).

18. The method of claim 16, wherein act (b) comprises the act of:
determining that the current memory space for the first logical buffer and the second memory space for the second logical buffer are different memory spaces, wherein the current memory space and the first memory space are a same memory space.

19. The method of claim 16, further comprising the act of:
(f) reading current tile data from a current memory space associated with a first logical buffer,
wherein the new tile data to be written includes data for fewer than all pixels of the current tile, and wherein act (f) occurs subsequently to act (a) and before act (b).

* * * * *